United States Patent [19]

Blach et al.

[11] Patent Number: 4,527,899

[45] Date of Patent: Jul. 9, 1985

[54] PROCESSING SHAFT FOR MACHINES FOR EXTRUDING, KNEADING, DISPERSING, MIXING OR HOMOGENIZING, IN PARTICULAR, PLASTICS MATERIALS

[76] Inventors: Josef A. Blach, Wilhelmstrasse 24, 7144 Asperg; Kurt Stade, 8754 Grossostheim, both of Fed. Rep. of Germany

[21] Appl. No.: 619,768

[22] Filed: Jun. 12, 1984

[30] Foreign Application Priority Data

Jun. 14, 1983 [DE]  Fed. Rep. of Germany ....... 3321383

[51] Int. Cl.$^3$ ............................. B29F 3/01; B29F 3/02; B29B 1/10
[52] U.S. Cl. .................................... 366/79; 100/117; 198/666; 198/677; 425/208; 425/376 R
[58] Field of Search ............ 425/208, 376 R; 366/79, 366/83-85; 198/625, 676, 677, 664, 666; 100/117

[56] References Cited

U.S. PATENT DOCUMENTS

| | | | |
|---|---|---|---|
| 375,931 | 1/1888 | Gunkel | 198/676 |
| 2,935,931 | 5/1960 | Ginaven | 100/117 |
| 3,067,672 | 12/1962 | French | 100/117 |
| 3,305,894 | 2/1967 | Boden et al. | 366/85 |
| 3,518,936 | 7/1970 | Bredeson | 100/317 |
| 3,637,069 | 1/1972 | Christian et al. | 198/677 |
| 3,672,641 | 6/1972 | Slaby | 100/117 |
| 3,814,563 | 6/1974 | Slaby et al. | 100/117 |
| 3,883,122 | 5/1975 | Werner | 366/85 |
| 4,073,013 | 2/1978 | Blach | 366/83 |
| 4,334,785 | 6/1982 | Blach | 366/79 |

FOREIGN PATENT DOCUMENTS

| | | | |
|---|---|---|---|
| 1244047 | 8/1971 | United Kingdom | 100/117 |
| 872295 | 10/1981 | U.S.S.R. | 100/117 |

*Primary Examiner*—Willard E. Hoag
*Attorney, Agent, or Firm*—Neuman, Williams, Anderson & Olson

[57] ABSTRACT

Processing shaft for machines for extruding or the like, comprising a core shaft having at its front end an axial stop member for slip-on processing members arranged non-rotationally on the core shaft, further comprising a spacer sleeve supporting the processing members rearwardly, and arranged non-rotationally at the rear end area of the core shaft a slip-on coupling sleeve on whose external thread a clamp nut is screwed, and also comprising a clamping force transmitting member tightenable rearwardly against a stop member of the core shaft by the clamp nut. To enable tightening of the processing members in an axial direction, also in the case that a processing shaft has been installed in a machine, the clamping force transmitting member is in the form of a transverse bolt which is inserted into a transverse channel of the core shaft forming the stop member, and, in addition, the coupling sleeve is supported in a forward direction via the spacer sleeve and the processing members on the front stop member of the core shaft.

7 Claims, 3 Drawing Figures

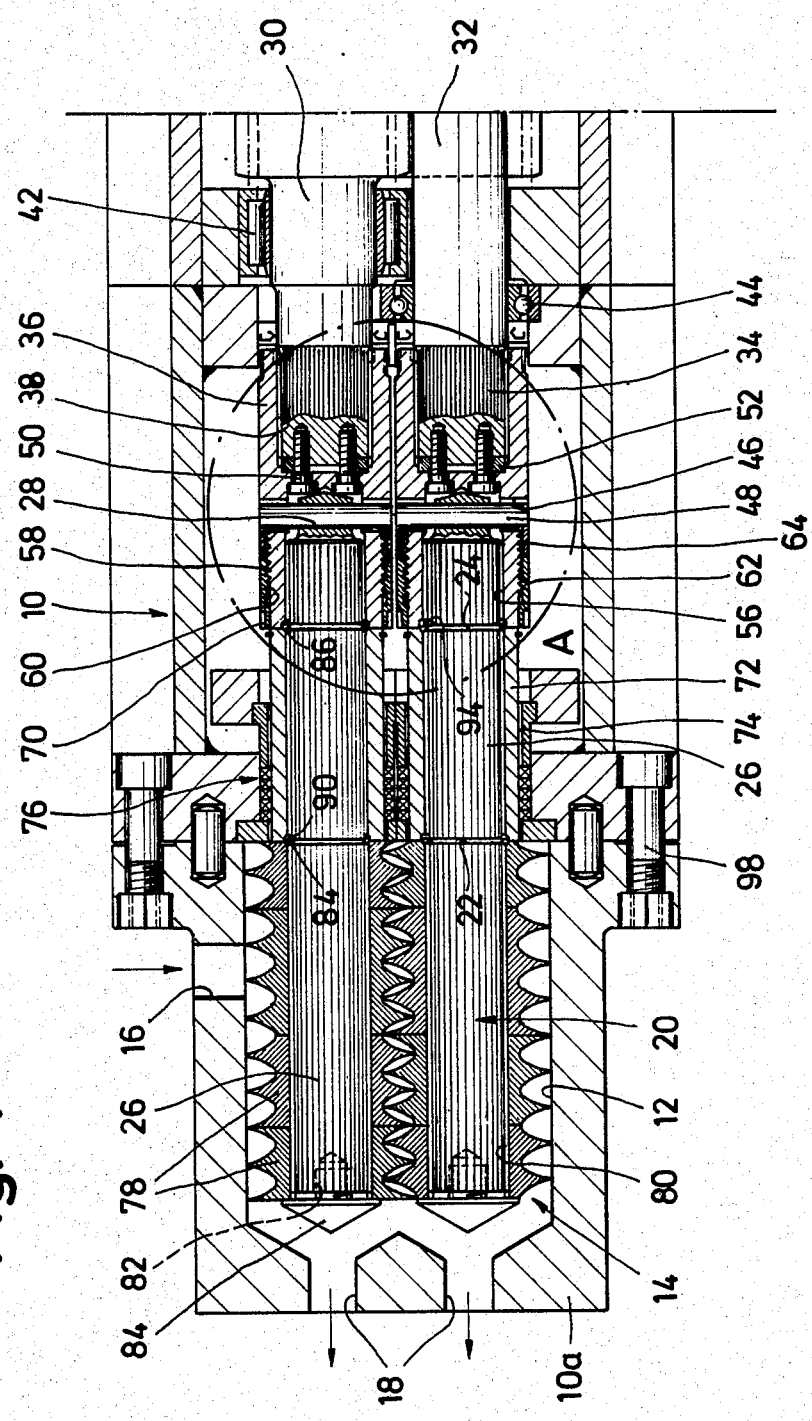

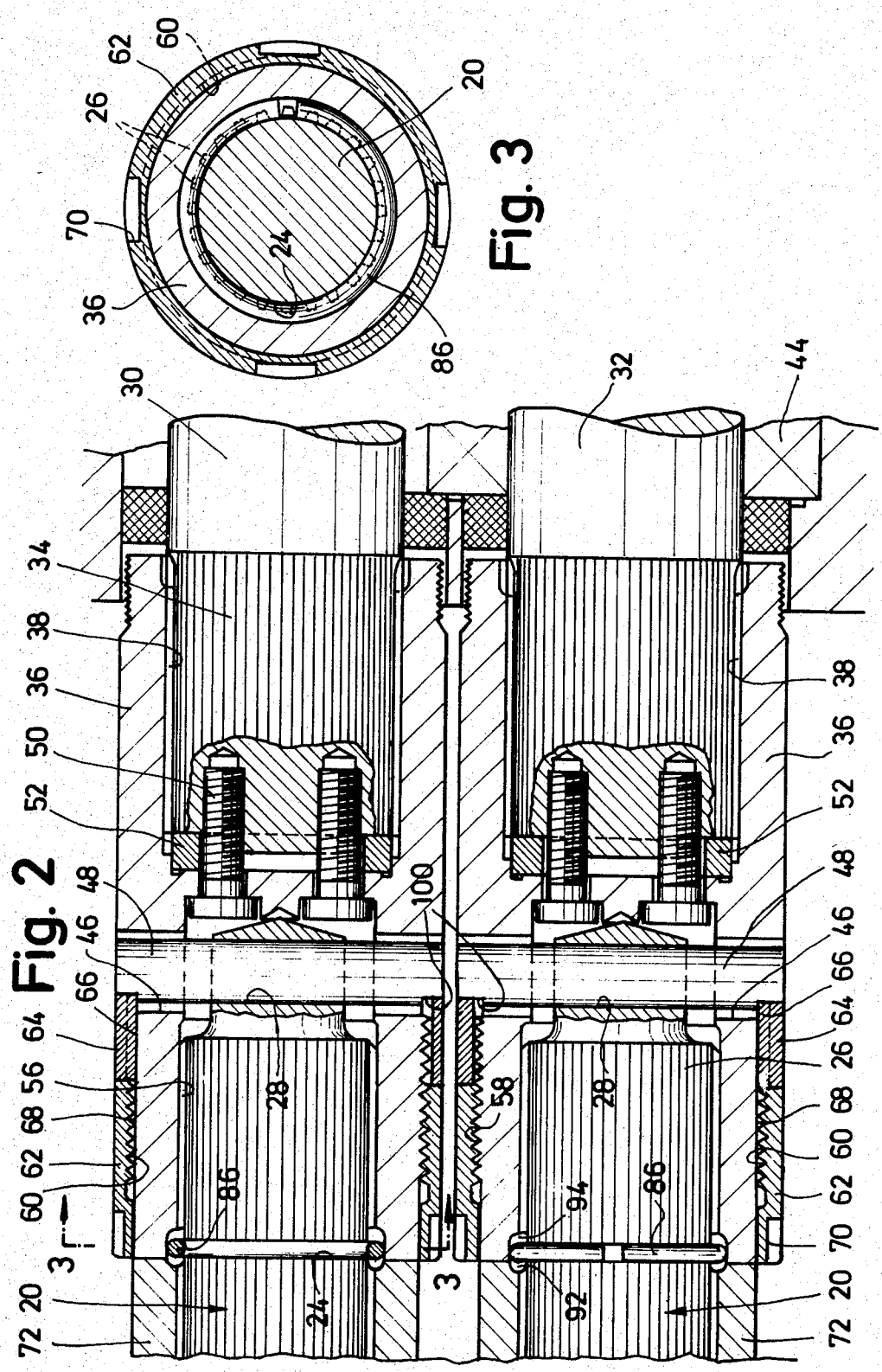

PROCESSING SHAFT FOR MACHINES FOR EXTRUDING, KNEADING, DISPERSING, MIXING OR HOMOGENIZING, IN PARTICULAR, PLASTICS MATERIALS

The invention relates to a processing shaft for machines for extruding, kneading, dispersing, mixing or homogenizing viscous, plastic, granular or pulverized materials, in particular, a processing shaft comprising a supporting or core shaft having at least one longitudinal groove and bushing-type or annular disc-shaped slip-on processing members which are provided with a projection for engagement with the core shaft longitudinal groove to prevent rotation on the core shaft, also comprising an axial securing member for the processing members which is attached to the front end of the core shaft, at least one slip-on spacer sleeve on the core shaft to support the processing members axially rearwardly, with a sealing surface for a stuffing box or the like on its external circumference, a slip-on coupling sleeve at the rear end area of the core shaft with which the processing shaft can be connected to a drive shaft and which is provided with a projection for engagement with the core shaft longitudinal groove for torque transmission and with an external thread onto which a clamp nut with an internal thread is screwed so as to overlap the coupling sleeve, and a clamping force transmitting member tightenable rearwardly against a stop member of the core shaft by the clamp nut.

The processing shafts in question, in particular, of screw shaft extruders, but also of other plastic processing machines of the aforementioned kind, must be removed occasionally for processing member exchange or cleaning purposes, which is only possible while the machine is warm (200° C.-300° C.) in order to avoid solidification of the plastic still inside the machine. The processing shafts should then actually be reinstalled in the warm state in order to produce the necessary sealing surface pressure between the various slip-on members on the core shaft, e.g., by tightening the aforementioned axial securing member outside the machine, and to prevent this sealing surface pressure from being decreased by heat expansion of the core shaft during operation of the machine or from even disappearing completely. If this occurs, plastic material is caused by the high pressures acting in the machine to enter between the various slip-on members on the core shaft and turns into coke there since there is no more exchange of material. As a consequence, the various members which have been slipped onto the core shaft cannot be removed later. In the case of the hitherto known processing shafts of the kind in question, however, the sealing surface pressure between the faces of the various slip-on members on the core shaft, such as processing members and spacer sleeve, cannot be further increased if the processing shaft has been built into the machine because the clamping member responsible for producing the sealing surface pressure is no longer accessible.

The core shaft of a known processing shaft of the kind mentioned at the outset comprises a set of splines extending throughout the entirety of its length and at its front end an axial threaded bore into which the securing member can be screwed with a threaded shaft. This securing member protrudes radially beyond the core shaft, thus forming an axial stop member for the slip-on processing members on the core shaft, in the form of screw bushings, whose internal circumference profile corresponds to the splines of the core shaft. The latter also applies to the spacer sleeve located between the screw bushings and a divided stop ring which engages a circumferential groove of the core shaft whose splines are interrupted by the circumferential groove. The coupling sleeve likewise comprises on its internal circumference a set of splines with which it can be slipped onto the rear end of the core shaft, on the one hand, and onto the front end of a drive shaft, on the other hand, for transmission of the drive torque onto the core shaft. In the area of its front end, the coupling sleeve furthermore comprises an external thread onto which the clamp nut, in the form of a cap nut, can be screwed. The latter comprises a bore which is stepped in such a manner that it forms a stop shoulder for the stop ring which by tightening the clamp nut can therefore be tightened against the front face of the coupling sleeve and the one cheek of the core shaft circumferential groove partially accommodating the stop ring that is formed by the splines of the core shaft. It therefore follows that with the clamp nut of this known processing shaft, the core shaft can be tightened with its rear face against the front face of the drive shaft engaging the coupling sleeve, but the sealing surface pressure between the screw bushings cannot be increased because the spacer sleeve is supported at the rear against the stop ring and the latter is pulled by the clamp nut to the rear together with the core shaft relatively to the coupling sleeve.

This known processing shaft does, however, have further disadvantages: Firstly, there is the danger of the splines of the core shaft being crushed by the stop ring when the clamp nut is tightened. Secondly, it is extremely difficult to remove the processing shaft without its spacer sleeve, for to do so, after releasing the clamp nut from the coupling sleeve, the divided stop ring would also have to be removed from the core shaft groove since in the usual procedure of removing the core shaft in the forward direction, this stop ring otherwise pulls the spacer sleeve along with it in the forward direction. However, if the spacer sleeve is sealed, as is usually the case, against a stuffing box surrounding it, the pulling out of the spacer sleeve causes swelling of the stuffing box in a radial inward direction, with the result that the stuffing box has to be newly stuffed.

It is, however, quite clear that removal of the divided stop ring from the core shaft circumferential groove is extremely difficult, if not at all impossible, when the machine is hot.

The object underlying the invention is to improve the known processing shaft of the kind mentioned at the outset in such a way that, also in the case that the processing shaft has been built into the machine, the axial sealing surface pressure between the faces of the slip-on processing members on the core shaft can be tightened so as to enable installation of the processing shaft in the cold state in the hot machine and relatively easy resetting of those components between which the processing members are clamped after the processing shaft has warmed up to operating temperature, in order to increase the aforementioned sealing surface pressure.

This object is attained in accordance with the invention in that the transmitting member with which the axial clamping force is applied to the core shaft is in the form of a bolt which extends transversely to the core shaft axis and is inserted into a channel of the core shaft forming a stop surface and likewise extending transversely to the core shaft axis, and in that the coupling sleeve is supported in a forward direction via the spacer sleeve and the processing members on the securing member.

The design of the member transmitting the axial clamping force to the core shaft as a bolt extending transversely to the core shaft axis enables very simple release of the connection between coupling sleeve and core shaft after the camp nut has been slackened, and since the axial securing member disposed at the front end of the core shaft forms an abutment for the reaction forces applied to the coupling sleeve when the clamp nut is tightened, the axial clamping forces acting on the components which are arranged between securing member and coupling sleeve and have been slipped onto the core shaft, are increased when the clamp nut is tightened. It is, however, also quite feasible for the clamp nut to be designed in such a way as to be tightenable through an aperture in the machine housing by means of a key or another suitable tool.

The channel in the core shaft could be in the form of a lateral transverse groove, but an embodiment in which the channel is formed by a transverse bore in the core shaft is preferred.

To prevent the clamp nut from slackening during operation of the machine, it is supported, in a preferred embodiment, on the bolt via a thrust collar which is arranged for longitudinal displacement, but non-rotationally, on the coupling sleeve.

In order to eliminate the possibility of the bolt unintentionally falling out of the core shaft channel accommodating it, it is, furthermore, recommendable to secure it by providing on its circumference at least one recess which is engaged by the clamp nut or the thrust collar.

As previously mentioned, the processing shaft is removed from the machine housing in a forward direction firstly by the clamp nut being slackened until it or the thrust collar releases the bolt, whereupon the latter is removed and the core shaft thus released from the coupling sleeve. If the core shaft is now pulled out of the machine housing in a forward direction, there is no guarantee that the slip-on components on the core shaft are pulled out along with the core shaft. If processing member and spacer sleeve are to be removed together with the core shaft, there is provided, in a preferred embodiment of the construction according to the invention, a resiliently expandable stop ring which engages a core shaft circumferential groove, but protrudes radially beyond the latter and is located behind the rear end of the spacer sleeve. It, therefore, forms an axial stop member for the spacer sleeve. To prevent this stop ring from disadvantageously impairing the splines on the core shaft in the same manner as explained above with reference to the known processing shaft, the spacer sleeve and the circumferential groove of the core shaft are designed and arranged relatively to one another in such a way that the stop ring is free of forces in an axial direction when the clamp nut is tightened. The stop ring must be resiliently expandable in order for it to be insertable at all in the core shaft circumferential groove.

If the spacer sleeve is sealed against a stuffing box surrounding it, and the spacer sleeve is to remain in the machine when the core shaft and the processing members are removed, a recommendable design is one in which the core shaft comprises in the area of the front end of the spacer sleeve a circumferential groove in which a resiliently expandable stop ring protruding beyond the circumferential groove is arranged and forms an axial stop member for the rearmost processing member, with the latter and the circumferential groove being designed and arranged relatively to one another in such a way that the stop ring is free of forces in an axial direction when the clamp nut is tightened. Upon removal of the core shaft, all of the processing members are then pulled out of the machine housing in a forward direction, but not the spacer sleeve, which remains within the seal surrounding it.

Further features, advantages and details of the invention are apparent from the enclosed claims and/or the following description and the attached illustration of a screw shaft extruder whose screw shafts represent a particularly advantageous embodiment of the processing shaft according to the invention. The drawings show:

FIG. 1 which is a longitudinal section through the main parts of a plastics material extruder with screw shafts according to the invention;

FIG. 2 which is an enlarged illustration of the section designated "A" in FIG. 1, and FIG. 3 which is a section taken along line 3—3 in FIG. 2.

A machine housing 10 comprises two parallel stepped housing bores 12 with a screw shaft 14 mounted in each. Several housing apertures, only one of which is illustrated at 16, serving, for example, to feed the machine with the plastics material to be processed, to add constituents which are to be admixed, or to degasify the treated material, lead into the housing bores 12. Finally, the machine housing 10 comprises two outlets 18 through which the plastics material which has been processed by the screw shafts 14 is pressed out of the machine housing at high pressure and through a following extrusion tool which is not illustrated.

Each of the screw shafts 14 has a supporting or core shaft 20 with a set of splines 26, which is interrupted only by a front and a rear circumferential groove 22 and 24, respectively, but otherwise extends continuously, and is provided with a transverse bore 28 in its rear end area. The two screw shafts are driven by drive shafts 30 and 32, each comprising in their front end area a set of splines 34 and protruding into coupling sleeves 36 comprising a corresponding set of splines 38 so as to enable the drive torque to be transsmitted from the drive shafts 30 and 32 to the core shafts 20. Two radial bearings 42 and 44 for the drive shafts 30 and 32 are, in fact, shown in FIG. 1, but the further bearings for these shafts are not illustrated. Since quite substantial torques are transmitted via the drive shafts and, on account of the high pressure prevailing in front of the screw shafts 14, the drive shafts must also be able to receive very high axial pressures, radial and axial bearings of relatively large dimensions are required for the drive shafts 30 and 32. It is unnecessary to illustrate and describe these bearings here as their arrangement and design are indicated in the papers relating to patent application P 32 01 952.1.

The coupling sleeves 36 also comprise a transvers bore 46 whose diameter is, however, larger than that of the transverse bores 28 of the core shafts 20, so that clamp bolts 48 fitted into the latter can be accommodated with play by the transverse bores 46 of the coupling sleeves. The coupling sleeves 36 are axially secured to the drive shafts 30, 32 by screws 50, and tolerance compensating rings 52 are arranged between the coupling sleeves and the front faces of the drive shafts 30, 32 so that the screw shafts 14 can always be exactly positioned in an axial direction by selection of the thickness of these tolerance compensating rings, even if the bearing for the drive shafts 30 and 32 or the latter themselves exhibit tolerances in the axial direction.

The torque introduced into the coupling sleeves 36 from the drive shafts 30, 32 via the sets of splines 34, 38 is transmitted via a further internal set of splines 56 of the coupling sleeves and the set of splines 26 of the core shafts 20 to the latter. The coupling sleves 36 comprise an external thread 58 onto which a clamp nut 62 with an internal thread 60 is screwed. Positioned between the clamp nut and the respective clamp bolt 48 is a thrust collar 64 which is slipped onto the coupling sleeve and is prevented from rotating relative to the coupling sleeve 36 by engaging with a wedge 66 a longitudinal groove 68 of the coupling sleeve which has been machined into the coupling sleeve in the area of the external thread 58. At its front end, the clamp nut 62 is provided with a set of recesses 70 at which a suitable key may be placed for turning and tightening the clamp nut 62 through an aperture in the machine housing 10 which is not illustrated. Since the clamp bolt 48 is seated free from play in the transverse bore 28 of the respective core shaft 20, but the allowance of the transverse bore 46 in the coupling sleeve permits longitudinal displacement of the clamp bolt relative to the coupling sleeve, turing of the clamp nut 62 causes the respective core shaft 20 to be pulled to the right, in accordance with FIG. 1, relative to the coupling sleeve 36, in any case, far enough for the clamp bolt 48 to become contiguous with the wall of the transverse bore 46, which may, however, be prevented by appropriate selection of the bore diameter—the transverse bore 46 is only necessary at all to enable insertion of the clamp bolt 48 into the transverse bore of the core shaft 20.

Adjoining the coupling sleeve 36 is a spacer sleeve 72 which is slipped onto the respective core shaft 20 and may, but does not have to comprise a set of splines engaging the splines 26 of the core shaft 20. The external circumferential surface of the spacer sleeve 72 forms a sealing surface 74 which cooperates with a stuffing box, designated in its entirety as 76, which is inserted into the machine housing 10 and surrounds the spacer sleeve 72. Located in front of the spacer sleeve are several so-called screw bushings 78 which are slipped onto the respective core shaft 20 and comprise internally a set of splines 80 which meshes with the set of splines 26 of the respective core shaft 20 so that the screw shafts are driven by the core shaft. The external profile of the screw bushings is designed in such a way that each of the screw shafts 14 has a continuous screw shaft profile, and the two screw shafts intermesh, as is apparent from FIG. 1.

In accordance with the invention, the respective foremost screw bushing 78 protrudes beyond the respective core shaft 20 so as to form with a head section 84, which can be screwed into a threaded bore 82 of the core shaft, an abutment for the slip-on components on the core shaft.

In accordance with the invention, separated and, consequently, resiliently expandable stop rings 84 and 86, insertable into the grooves 22 and 24, form both assembly aids and means for disassembling certain components which have been slipped onto the core shafts when the core shafts 20 are removed from the machine housing 10 in a forward direction, i.e., to the left, in accordance with FIG. 1. The front stop ring 84 protrudes radially out of the front groove 22 to the extent that it forms a rear stop member for the rearmost of the screw bushings 78, and the same applies to the rear stop ring 86 with respect to the spacer sleeve 72. On the other hand, the spacer sleeve 72 and the coupling sleeve 36 comprise recesses 90, 92 and 94 for accommodation of the stop rings 84 and 86 which are of such large dimensions and are so arranged in the axial direction that in the case of ready assembled screw shafts 14 which have been built into the machine housing 10, these stop rings are free of forces in the axial direction (see the axial play of the rear stop rings 86 in the spacer sleeves 72 and the coupling sleeves 36 as illustrated in FIG. 2).

It is possible to disassemble the screw shafts 14 from the machine housing 10 in a forward direction because the machine housing is divided and held together by releasable screws 98 so that the left housing section 10a, as shown in FIG. 1, is removable.

Finally, the clamp bolts 48 are secured with the aid of the thrust collars 64 in the screw shafts 14 by the clamp bolts being provided at their ends with recesses 100 into which the thrust collars 64 fit.

To assemble the various components of a screw shaft 14 on the respective core shaft 20, the following steps are taken: First, the rear stop ring 86 is mounted, then the spacer sleeve 72 is slipped onto the core shaft from the front, the front stop ring 84 is subsequently mounted, and, finally, the screw bushings 78 are slipped on and secured with the aid of the head section 84. The stop rings 84 and 86 roughly determine the axial position of the spacer sleeve 72 and the screw busings 78 on the core shaft 20. The screw shaft is then inserted with the rear end of the core shaft 20 into the associated coupling sleeve 36, with the clamp nut 62 only being screwed so far onto the coupling sleeve for the thrust collar 64 to not yet overlap the transverse bore 46 in the coupling sleeve, so that the clamp bolt 48 can be subsequently inserted into the transverse bores 28 and 46. (It is possible to work through the aperture in the housing 10 which is not illustrated and then also permits turning of the clamp nut 62 with the aid of a suitable key.) The clamp nut 62 is subsequently tightened so that with the clamp bolt 48 the core shaft 20 is also pulled to the right in accordance with FIG. 1; on account of the reaction forces transmitted from the clamp nut to the coupling sleeve 36, the spacer sleeve 72 and the screw bushings 78 are axially clamped between the coupling sleeve 36 and the head section 84. Here, axial forces are not transmitted by the stop rings 84 and 86, as previously mentioned. It is now also understandable that the sealing surface pressure between the faces of the screw bushings 78 and the spacer sleeve 72, of the head section 84 and of the couping sleve 36 is simple to increase or reproduce, also when the machine is warm, by tightening the clamp nut 62. When the clamp nut 62 is tightened, the camp bolt 48 is furthermore automatically prevented from falling out of the coupling sleeve by the thrust collar 64.

Disassembly is carried out in the opposite sequence, with the spacer sleeve 72 being prevented from being pulled out of the stuffing box 76, when the core shaft 20 is removed from the machine housing, by omitting the rear stop ring 86 when the screw shaft is being assembled.

What is claimed is:

1. Processing shaft for machines for extruding, kneading, dispersing, mixing or homogenizing viscous, plastic, granular or pulverized materials, comprising a core shaft having at least one longitudinal groove and annular disc-shaped or bushing-type slip-on processing members which are provided with a projection for engagement with the core shaft longitudinal groove to prevent rotation on the core shaft, also comprising an axial securing member for the processing members which is attached to the front end of the core shaft, at least one slip-on spacer sleeve on the core shaft to support the processing members axially rearwardly, with a sealing surface on its external circumference, a slip-on coupling sleeve at the rear end area of the core shaft with a projection for engagement with the core shaft longitudinal groove for torque transmission and with an external thread onto which a clamp nut with an internal thread is screwed so as to overlap the coupling sleeve, and a clamping force transmitting member tightenable rearwardly against a stop member of the core shaft by the clamp nut, characterized in that the transmitting member is in the form of a bolt (48) which extends transversely to the core shaft axis and is inserted into a channel (28) of the core shaft (20) forming the stop member and likewise extending transversely to the core shaft axis, and in that the coupling sleeve (36) is supported in a forward direction via the spacer sleeve (72) and the processing members (78) on the securing member (84).

2. Processing shaft according to claim 1, characterized in that the channel is in the form of a transverse bore (28) of the core shaft (20).

3. Processing shaft according to claim 1, characterized in that the clamp nut (62) is supported on the bolt (48) via a thrust collar (64) arranged for longitudinal displacement, but non-rotationally on the coupling sleeve (36).

4. Processing shaft according to claim 1, characterized in that to secure the bolt (48), the latter comprises on its circumference at least one recess (100) which the clamp nut (62) or the thrust collar (64) engages.

5. Processing shaft according to claim 1, characterized in that the core shaft (20) comprises in the area of the rear end of the spacer sleeve (72) a circumferential groove (24) in which a resiliently expandable stop ring (86) projecting beyond the latter is arranged and forms an axial stop for the spacer sleeve (72), with the latter and the circumferential groove (24) being designed and arranged relative to each other in such a way that the stop ring (86) is free of forces in an axial direction when the clamp nut (62) is tightened.

6. Processing shaft according to claim 1, characterized in that the core shaft (20) comprises in the area of the front end of the spacer sleeve (72) a circumferential groove (22) in which a resiliently expandable stop ring (84) projecting beyond the latter is arranged and forms an axial stop for the rearmost processing member (78), with the latter and the circumferential groove (22) being designed and arranged relative to each other in such a way that the stop ring (84) is free of forces in an axial direction when the clamp nut (62) is tightened.

7. Processing shaft according to claims 5 or 6, characterized in that the stop ring (84,86) is divided in the circumferential direction.

* * * * *